United States Patent [19]

Turner

[11] Patent Number: 5,546,738
[45] Date of Patent: Aug. 20, 1996

[54] DEVICE FOR COLLECTING LAWN DEBRIS

[76] Inventor: Bruce A. Turner, 1647 N. Battlecreek Rd., Oconomowoc, Wis. 53066

[21] Appl. No.: 335,471

[22] Filed: Nov. 7, 1994

[51] Int. Cl.⁶ .............................. A01D 49/00; A01D 75/28
[52] U.S. Cl. .................................. 56/202; 56/16.6; 56/194
[58] Field of Search ............................ 56/16.6, 194, 199, 56/202, 207; 171/144; 280/19, 24, 456.1, 457, 458

[56] References Cited

U.S. PATENT DOCUMENTS

| | | | |
|---|---|---|---|
| 976,811 | 11/1910 | Kloss | 171/144 X |
| 2,067,916 | 1/1937 | Haffner et al. | 56/199 |
| 2,390,321 | 12/1945 | Packwood | 56/202 |
| 3,355,187 | 11/1967 | Brindle | 280/19 |
| 3,903,565 | 9/1975 | Hicks | 56/202 X |
| 4,046,393 | 9/1977 | Vadnais | 280/19 |
| 4,173,351 | 11/1979 | Hetland | 280/19 |
| 4,259,832 | 4/1981 | DuRay | 56/202 |
| 4,522,019 | 6/1985 | Edwards et al. | 56/202 |
| 4,648,238 | 3/1987 | Greider et al. | 56/202 |
| 4,819,417 | 4/1989 | Bryant et al. | 56/202 |
| 5,104,133 | 4/1992 | Reiner | 280/19 |
| 5,211,434 | 5/1993 | Lanava | 294/1.1 |

FOREIGN PATENT DOCUMENTS 807497  6/1951  Germany.
 58480 10/1937  Norway.

*Primary Examiner*—George A. Suchfield
*Attorney, Agent, or Firm*—Michael, Best & Friedrich

[57] ABSTRACT

A leaf clipping collector including a bottom wall made of rigid plastic and having an out edge defining a generally circular periphery, a generally vertically extending sidewall rigidly fixed relative to the bottom wall, the sidewall having a lower edge integrally formed with the outer edge of the bottom wall and having an upper edge an opening, the sidewall having extending therethrough a pair of slots, and a strap extending through the pair of slots and having opposite ends.

3 Claims, 1 Drawing Sheet

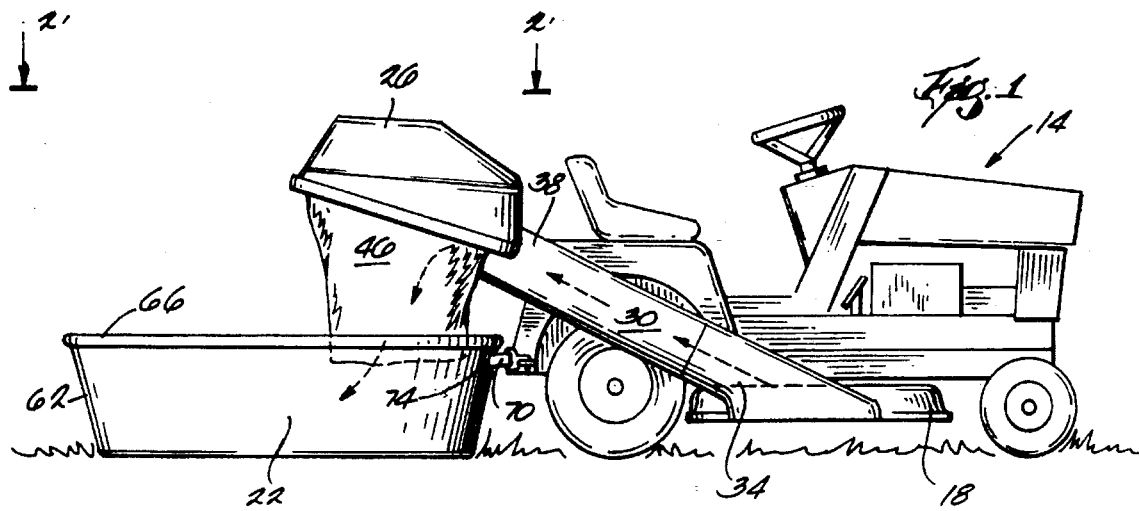
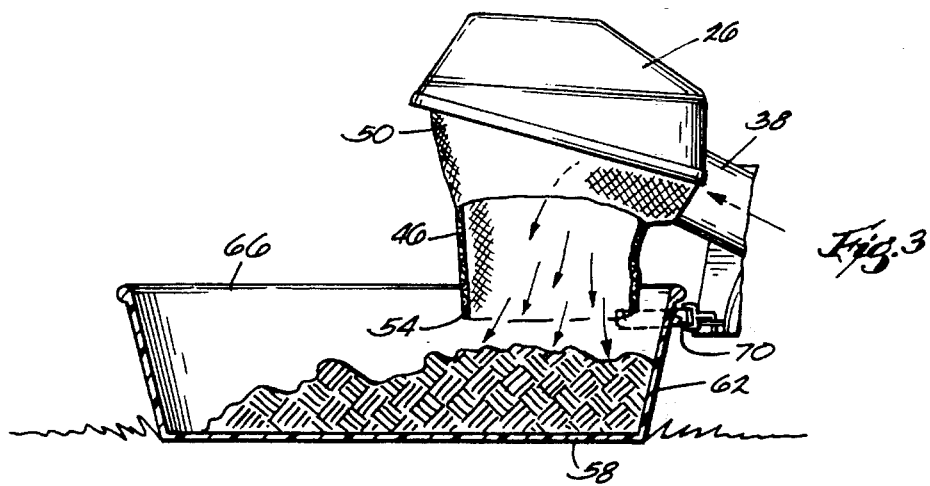
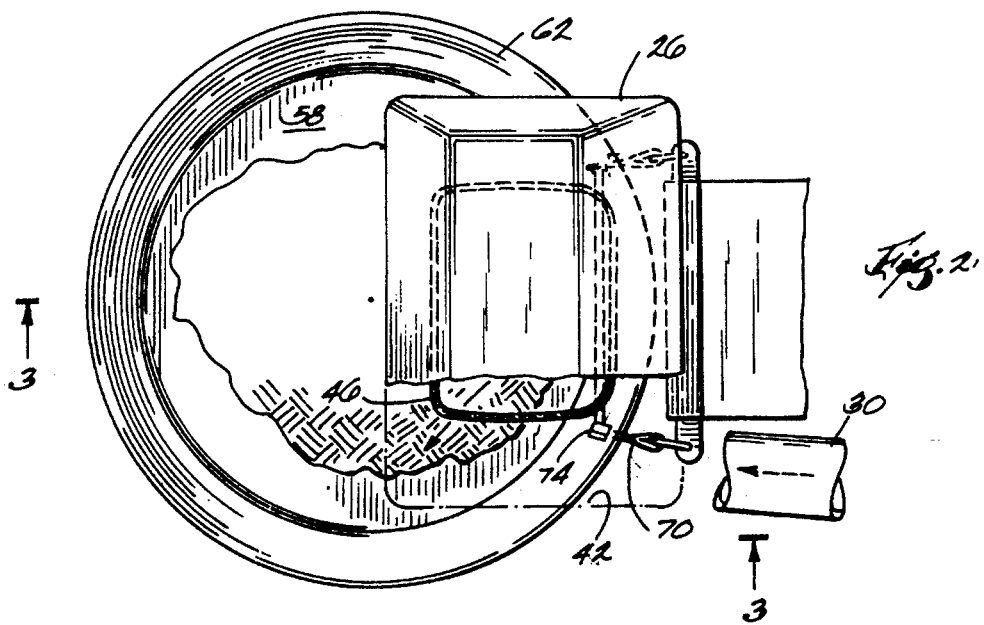

DEVICE FOR COLLECTING LAWN DEBRIS

BACKGROUND OF THE INVENTION

1. Technical Field

The invention relates generally to devices for collecting lawn clippings, and particularly to such devices which can be used with a mower.

2. Related Prior Art

Various types of devices are known for use to collect and transport lawn clippings, leaves and other like debris. Examples of several such devices are shown in the following patent documents: U.S. Pat. No. 5,211,434 which issued on May 18, 1993 to Lanava; U.S. Pat. No. 5,104,133 which issued on Apr. 14, 1992 to Reiner; U.S. Pat. No. 4,046,393 which issued on Sep. 6, 1977 to Vadnais; U.S. Pat. No. 4,173,351 which issued on Nov. 6, 1979 to Hetland; U.S. Pat. No. 3,355,187 which issued on Nov. 28, 1967 to Brindle; Norway Patent No. 58480; and German Patent No. 807,497.

It is also generally known to connect such devices to a tractor to haul the debris. For example, the above noted U.S. Pat. No. 5,104,133 discloses a hauling device that is suitable for drawing by hand or by a tractor.

It is also generally known to collect lawn clippings and the like thrown by the mower on tractor. Some such systems provide an enclosed collecting container or bag which is carried by the tractor and to which the debris is conducted.

SUMMARY OF THE INVENTION

The use of a tractor to gather and have debris has several obvious advantages, including speed and efficiency. In addition, the use of a mower on a tractor mulches the debris, which reduces the volume of the debris. However, the use of known collection devices has heretofore proven inadequate for use with a tractor. The known devices that are supported by a tractor and that provide an enclosed container are relatively small and fill with debris quickly. Accordingly, such devices must be emptied frequently, which can significantly decrease the efficiency attained by using a tractor.

The other above-noted devices for collecting and transporting lawn clippings typically provide either flexible or hinged structures. Such structures permit at least a portion of the device to be laid flat to facilitate loading debris onto the device. The structure, when loaded then can be moved into a transporting position such that the debris is retained by the device. However, such flexible devices have also proven inadequate for use with a tractor.

In some instances, the devices have rectangular or otherwise angular outer configurations which do not lend themselves to being hauled behind a tractor. In other instances, the devices do not provide sides or other means for retaining a sufficiently large volume of debris. In additional instances, the collection devices are too flexible and are ill-suited to negotiate corners behind a tractor.

The invention provides a system for collecting lawn clippings from a tractor having a mower deck and for collecting and containing the debris. In one embodiment, the system includes a conduit for conducting a flow of debris from the mower deck of a lawn mower to a chute which empties into a rigid, one-piece collector. The collector is made of a lightweight, durable plastic and has a flat bottom wall. A generally cylindrical side wall extends upward from the bottom wall to above the chute so that debris from the chute is directed into the collector. The collector has a capacity to collect and retain a large volume of debris.

The bottom wall and sidewall are of the collector integrally formed and provide a generally smooth outer surface. The rigidity and exterior surface of the collector provide a device that is well-suited for being hauled by a tractor. The collector is hitched to the rear of the tractor by a nylon strap which is threaded through a pair of slots in the sidewall of the collector.

The invention thus provides a rigid collector that has a high volume capacity and that can negotiate corners when following behind a tractor. The collector is easy to connect and disconnect from a tractor and is also easy to empty.

Various other features and advantages of the invention will become apparent to those skilled in the art upon review of the following detailed description, claims and drawings.

DESCRIPTION OF THE DRAWINGS

FIG. 1 illustrates a system for use with a lawn tractor for collecting lawn clippings.

FIG. 2 is a plan view from above of the system shown in FIG. 1.

FIG. 3 is a cross-sectional view taken along line 3—3 in FIG. 2.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

FIGS. 1–3 illustrate a system 10 for use with a lawn tractor 14 for collecting lawn clippings, leaves, and other like debris. The lawn tractor 14 includes a mower blade (not shown) housed by a mower deck 18. In this and in all other respects, the tractor 14 is conventional and will not be further described.

The system 10 includes a collector 22 which is connected to the rearward end of the tractor 14, a deflector housing 26 which is mounted on the rearward end of the tractor 14 generally above the collector 22, and a clipping conduit 30 for conducting a flow of debris from the mower deck 18 to the collector 22.

More particularly, the conduit 30 extends rearwardly from a first end 34 which communicates with the mower deck 18 to a second end 38 which communicates with the deflector housing 26. The deflector housing 26 defines an interior chamber 42 (shown in FIG. 2) into which debris is conducted by the conduit 30.

The system 10 also includes a chute 46 supported by the housing 26 and having an upper end 50 communicating with the chamber 42 and having an open lower end 54. The chute 46 is made of a flexible plastic or canvas material and extends into the collector 22. Debris from the conduit 30 is deflected downwardly by the deflector housing 26 and falls through the chute 46 into the collector 22. Preferably, the collector is made of a tough, durable plastic.

The collector 22 a rigid, one-piece device that is supported by the ground. The collector 22 includes a bottom wall 58 having a generally circular peripheral edge, and a vertically extending sidewall 62 which is rigidly fixed to the bottom wall 58. The sidewall 62 is generally cylindrical and has a lower edge integrally formed with the outer edge of the bottom wall 58. The upper edge 66 of the sidewall 62 is located above the lower end 54 of the chute 46 and defines an opening surrounding the lower end 54 of the chute 46.

The collector 22 is connected to the rearward end of the tractor 14 by a strap 70 extending through a pair of slots 74 in the sidewall 62 and having opposite ends which are hooked onto a draw bar on the rearward end of the tractor 14. Preferably, the slots 74 are located so that the strap 70 extends through the slots 74 generally horizontally, but are somewhat below the draw bar so that the strap 70 slightly lifts the forward edge of the bottom wall 58 of the collector 22.

In operation, the system 10 conducts lawn debris from the mower deck 18, through the deflector housing 26 and chute 46, and to the collector 22. Debris falling through the chute 46 piles on the bottom of the collector 22 and is retained by the sidewall 62. The bottom wall 58 and sidewall 62 of the collector 22 are fixed relative to each other and provide a generally smooth outer surface. The rigidity and exterior surface of the collector 22 provide a device that is well-suited for being hauled by the tractor 14. The collector 22 has a high volume capacity and, because of the relatively smooth, cylindrical outer surface, can negotiate corners when following behind the tractor 14. The collector 22 is easy to connect and disconnect from the tractor 14 by hooking and unhooking the ends of the strap 70 from the tractor 14, and is also easy to empty.

Various other features of the invention are set forth in the following claims:

I claim:

1. A lawn clipping collector comprising
  a generally flat bottom wall made of rigid plastic and having an outer edge defining a generally circular periphery,
  a generally vertically extending sidewall rigidly fixed relative to the bottom wall, the sidewall having a lower edge integrally formed with the outer edge of the bottom wall and having an upper edge defining an opening, the sidewall having extending therethrough a pair of slots, and
  a strap extending through the pair of slots and having opposite ends.

2. A system for collecting lawn clippings from a tractor having a mower deck, the system comprising
  a passage for conducting a flow of debris from the mower deck, the passage having a first end communicating with the mower deck and a second end through which the flow discharges,
  a rigid, one-piece collector supported by the ground and including a bottom wall having an outer edge defining a generally circular periphery and a generally vertically extending sidewall rigidly fixed to the bottom wall, the sidewall having a lower edge joining the outer edge of the bottom wall and having an upper edge located above the second end of the passage, the upper edge of the sidewall defining an opening in communication with the second end of the passage, the sidewall having extending therethrough a pair of slots, and
  a strap extending through the pair of slots and having opposite ends fixed to the tractor.

3. A system for collecting lawn clippings from a tractor having a mower deck, the system comprising
  a clipping conduit for conducting a flow of debris from the mower deck, the conduit having a first end communicating with the mower deck and a second end,
  a deflector housing supported by the tractor and defining an interior chamber communicating with the second end of the conduit,
  a chute supported by the housing and having an upper end communicating with the interior chamber and having an open lower end,
  a rigid, one-piece collector supported by the ground and including a bottom wall having a generally circular periphery and a generally vertically extending sidewall rigidly fixed relative to the bottom wall, the sidewall having a lower edge integrally formed with the outer edge of the bottom wall and having an upper edge located above the lower end of the chute, the upper edge of the sidewall defining an opening surrounding the lower end of the chute, the sidewall having extending therethrough a pair of slots, and
  a strap extending through the pair of slots and having opposite ends fixed to the tractor.

* * * * *